No. 825,775. PATENTED JULY 10, 1906.
E. STUMPF.
CAKE CUTTER.
APPLICATION FILED MAY 4, 1905.
2 SHEETS—SHEET 1.
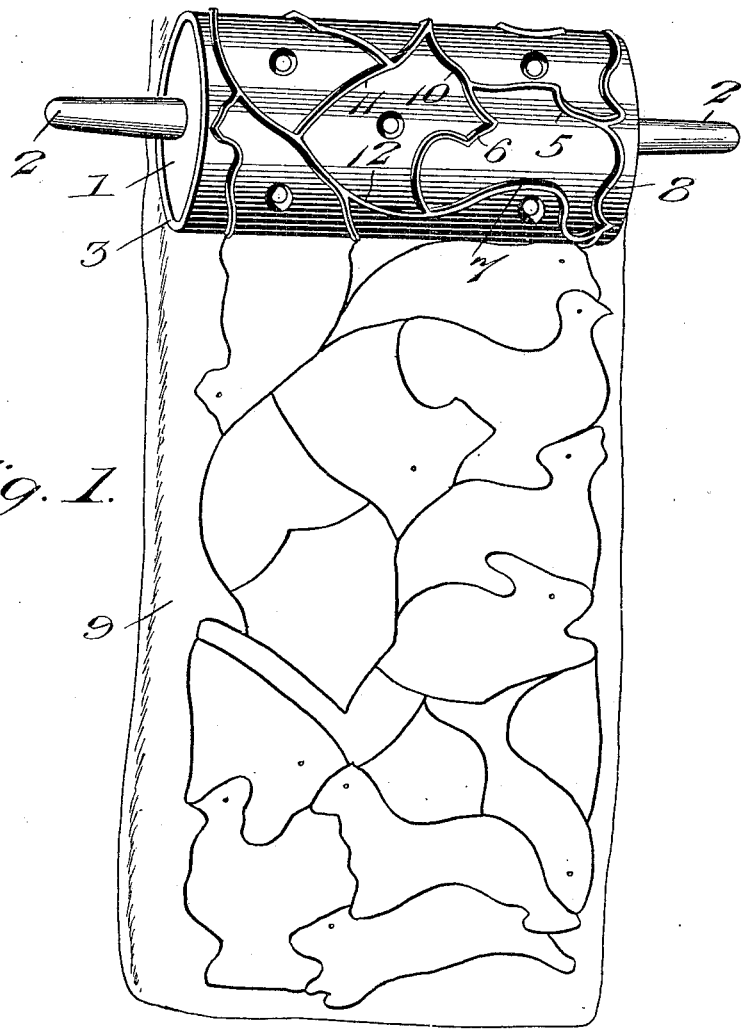
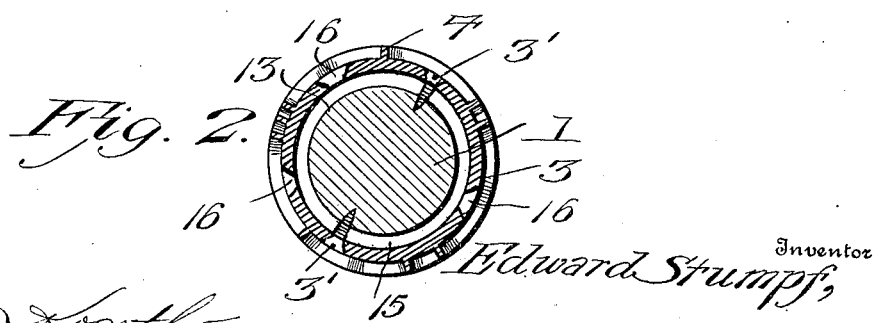
Witnesses
Inventor
Edward Stumpf,
By Victor J. Evans
Attorney No. 825,775. PATENTED JULY 10, 1906.
E. STUMPF.
CAKE CUTTER.
APPLICATION FILED MAY 4, 1905.

2 SHEETS—SHEET 2.

Witnesses
Inventor
Edward Stumpf,
By Victor J. Evans
Attorney

UNITED STATES PATENT OFFICE.

EDWARD STUMPF, OF JERSEY CITY, NEW JERSEY.

CAKE-CUTTER.

No. 825,775.   Specification of Letters Patent.   Patented July 10, 1906.

Application filed May 4, 1905. Serial No. 258,831.

*To all whom it may concern:*

Be it known that I, EDWARD STUMPF, a citizen of the United States, residing at 254 Bowers street, Jersey City, in the county of Hudson and State of New Jersey, have invented new and useful Improvements in Cake-Cutters, of which the following is a specification.

This invention relates to improvements in cake-cutters, and has for its object to provide a cake-cutting device which will simultaneously cut out a plurality of sections or figures of various shapes from a sheet of dough in such manner as to leave no intervening or waste portions of dough between the sections or figures, thereby reducing wastage to the minimum.

The preferred embodiment of the invention is shown in the accompanying drawings, in which—

Figure 4:
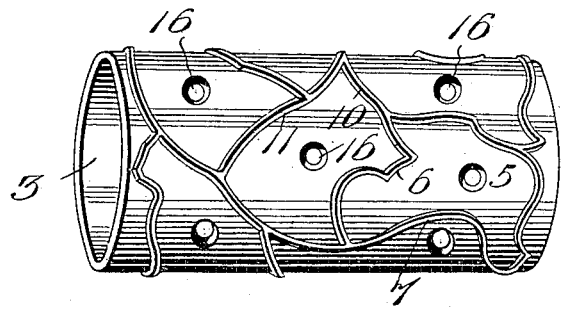
Figure 5:
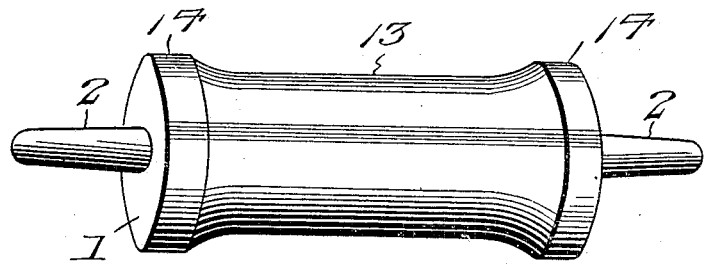
Figure 3:
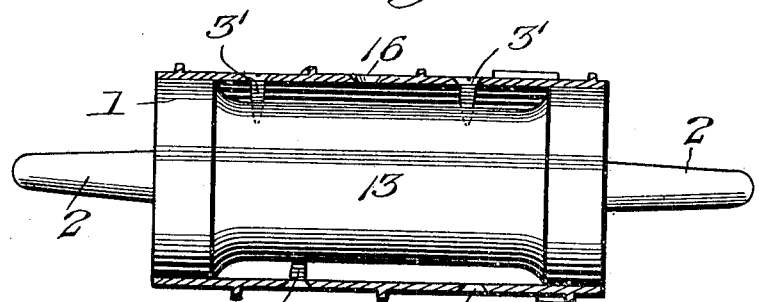

Figure 1 is a perspective view of my improved cake-cutter, illustrating the operation of the same in cutting out a plurality of figures from a sheet of dough; and Fig. 2 is a cross-section through the cutter. Fig. 3 is a longitudinal section through the sleeve, the body or core of the cutter being shown in elevation. Fig. 4 is a detail perspective view of the sleeve. Fig. 5 is a similar view of the body or core.

Referring now more particularly to the drawings, the numeral 1 designates the body or core of the cutter, which is in the form of a roller provided at its ends with handles 2 to adapt it to be rolled over a sheet of dough. Surrounding the body is a sleeve 3, secured thereto by permanent or detachable fastenings 3', which may consist of ordinary screws, as shown.

The sleeve 3, which forms the operating-surface of the cutter, is provided upon its outer surface or periphery with cutting ribs or flanges 4. These are arranged in the form of an endless or annular irregularly-filamented web (simulating a spider's web) extending continuously around the surface of the sleeve. The filaments or connecting elements of this web, all of which are cutting ribs or surfaces, form a series of figures which vary in shape as desired. In the present instance I have shown the filaments, ribs, or flanges properly shaped and relatively arranged to form or simulate the shapes of the heads or bodies of various birds and animals; but they may be arranged to produce other figures or characters. It will be observed that the ribs or walls, which coöperate to form any certain figure, partially or wholly form the sides, walls, or adjacent portions of the contiguous figures or figure. For example, the ribs 5, 6, and 7, which, in connection with the rib 8, form the figure of a hen or chicken, are so shaped as to also form the sides or adjacent portions of contiguous figures, producing the representation of a dog's head, a sea-lion, and a pigeon, as will appear more clearly from the representation of the shapes of cakes cut out by the action of the cutter from the sheet of dough 9, (shown in Fig. 1,) while the ribs 6, 10, 11, and 12, forming the dog's-head cutter, in turn form the sides or adjacent portions of other contiguous figures in the web. Hence the flanges or filaments of the portions of the figures between the boundary filaments forming the intermediate walls of adjacent figures are shaped to simultaneously produce different characteristic portions of contiguous figures. The roller may therefore be said to be provided with a series or group of cutters so associated that the forming elements of any one cutter form one or more of the contiguous sides or elements of one or more adjacent cutters.

The cutter is rolled over the sheet of dough from which the cakes are to be cut after the manner of an ordinary rolling-pin, the ribs 4 acting to cut out a group or series of cakes in the manner illustrated in Fig. 1, the cakes or divided sections of dough conforming in shape or configuration with the series or groups of cutters of the cutting-roll. Owing to the construction and arrangement of these cutters the adjacent edges of the cut-out sections of dough will meet or abut, leaving no intervening or waste dough between them. Hence the necessity of removing small intervening portions of dough is avoided and the amount of dough not cut into form for cakes reduced to the minimum.

If desired, the fastenings 3' may detachably connect the sleeve 3 with the body 1, as shown, in order that a series of sleeves bearing cutting-surfaces for producing groups of cakes bearing the forms of birds, animals, figures, or characters of any type and various geometrical objects may be interchangeably used in connection with a single body or roll.

As shown, the body or core 1 is preferably formed between its ends with an annular recess 13, leaving the ends intact to provide shoulders 14 to support the sleeve. This recess is designed to produce between the core and sleeve an air space or chamber 15. Formed in the sleeve are air-holes 16, one or more for each cutter, which communicate with said air-space. By this construction air is permitted to escape from between the sleeve and dough when the cutter is rolled over the dough to prevent the dough from lumping, thereby enabling absolutely flat figures to be cut.

Having thus described the invention, what I claim as new is—

As a new and improved article of manufacture, a cake-cutting roller provided with a cutting-surface composed of cutting-ribs arranged to form an irregularly-filamented web, the filaments of the web being extended in variously-curved and sinuous lines to produce a plurality of animal or other figures of varying form, the flanges or filaments of the portions of the figures between the boundary filaments forming the intermediate walls of adjacent figures shaped to simultaneously produce different characteristic portions of contiguous figures, whereby in the action of the cutter an entire group of figures of different shapes may be cut out without waste of material between the figures.

In testimony whereof I affix my signature in presence of two witnesses.

EDWARD STUMPF.

Witnesses:
W. D. GREGORY,
FRED J. STUHR.